United States Patent
Lozano et al.

(10) Patent No.: US 7,489,944 B2
(45) Date of Patent: Feb. 10, 2009

(54) METHOD OF ALLOCATING POWER OVER CHANNELS OF A COMMUNICATION SYSTEM

(75) Inventors: Angel Lozano, Hoboken, NJ (US); Antonia Maria Tulino, Sperone (IT); Sergio Verdu, Princeton, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 540 days.

(21) Appl. No.: 11/141,065

(22) Filed: Jun. 1, 2005

(65) Prior Publication Data

US 2006/0276215 A1 Dec. 7, 2006

(51) Int. Cl.
*H04B 7/00* (2006.01)

(52) U.S. Cl. ............ 455/522; 455/67.11; 455/422.1; 455/450; 375/150; 375/232

(58) Field of Classification Search ............ 455/522
See application file for complete search history.

(56) References Cited

U.S. PATENT DOCUMENTS

| | | | | |
|---|---|---|---|---|
| 5,937,002 A * | 8/1999 | Andersson et al. | ......... | 375/131 |
| 5,982,766 A * | 11/1999 | Nystrom et al. | ......... | 370/347 |
| 6,188,906 B1 * | 2/2001 | Lim et al. | ......... | 455/453 |
| 6,208,873 B1 * | 3/2001 | Black et al. | ......... | 455/522 |
| 6,314,294 B1 * | 11/2001 | Benveniste | ......... | 455/452.2 |
| 6,393,276 B1 * | 5/2002 | Vanghi | ......... | 455/422.1 |
| 6,504,868 B1 * | 1/2003 | Koizumi | ......... | 375/232 |
| 6,650,912 B2 * | 11/2003 | Chen et al. | ......... | 455/574 |
| 6,795,424 B1 * | 9/2004 | Kapoor et al. | ......... | 370/343 |
| 6,944,460 B2 * | 9/2005 | Haartsen | ......... | 455/452.2 |
| 6,947,408 B1 * | 9/2005 | Liberti et al. | ......... | 370/345 |
| 6,956,893 B2 * | 10/2005 | Frank et al. | ......... | 375/147 |
| 7,035,245 B2 * | 4/2006 | Orr et al. | ......... | 370/342 |
| 7,145,971 B2 * | 12/2006 | Raleigh et al. | ......... | 375/347 |
| 7,162,211 B2 * | 1/2007 | Viswanath et al. | ......... | 455/101 |
| 7,173,973 B2 * | 2/2007 | Borran et al. | ......... | 375/260 |
| 7,177,658 B2 * | 2/2007 | Willenegger et al. | ......... | 455/522 |
| 7,181,170 B2 * | 2/2007 | Love et al. | ......... | 455/67.13 |
| 7,236,789 B2 * | 6/2007 | Balachandran et al. | ......... | 455/450 |
| 7,245,879 B2 * | 7/2007 | Sadri et al. | ......... | 455/67.11 |
| 7,277,730 B2 * | 10/2007 | Ylitalo | ......... | 455/562.1 |
| 7,286,609 B2 * | 10/2007 | Maltsev et al. | ......... | 375/267 |
| 2002/0181439 A1 * | 12/2002 | Orihashi et al. | ......... | 370/350 |
| 2003/0035469 A1 * | 2/2003 | Frank et al. | ......... | 375/150 |
| 2003/0050084 A1 * | 3/2003 | Damnjanovic et al. | ......... | 455/522 |
| 2003/0064745 A1 * | 4/2003 | Benveniste | ......... | 455/522 |
| 2003/0104831 A1 * | 6/2003 | Razavilar et al. | ......... | 455/522 |
| 2003/0138065 A1 * | 7/2003 | Mills et al. | ......... | 375/346 |
| 2004/0184399 A1 * | 9/2004 | Chiou | ......... | 370/206 |
| 2004/0198404 A1 * | 10/2004 | Attar et al. | ......... | 455/522 |
| 2005/0031047 A1 * | 2/2005 | Maltsev et al. | ......... | 375/260 |

(Continued)

OTHER PUBLICATIONS

Shannon, Claude E. "Communication in the Presence of Noise." Proceedings of the IEEE, vol. 86, No. 2, Feb. 1998. pp. 447-457.

*Primary Examiner*—Matthew D Anderson
*Assistant Examiner*—Hai V Nguyen

(57) ABSTRACT

In one embodiment, the power for transmitting signals over at least one of a plurality of parallel channels is allocated based on a channel strength threshold and an estimated channel strength for the at least one channel. Here, the channel strength threshold is based on the estimated channel strengths for the plurality of channels.

20 Claims, 2 Drawing Sheets

U.S. PATENT DOCUMENTS

| | | | |
|---|---|---|---|
| 2005/0032514 A1* | 2/2005 | Sadri et al. | 455/423 |
| 2005/0043033 A1* | 2/2005 | Fabien et al. | 455/452.1 |
| 2005/0075124 A1* | 4/2005 | Willenegger et al. | 455/522 |
| 2005/0094740 A1* | 5/2005 | Borran et al. | 375/267 |
| 2005/0135295 A1* | 6/2005 | Walton et al. | 370/328 |
| 2005/0135314 A1* | 6/2005 | Giannakis et al. | 370/335 |
| 2005/0141494 A1* | 6/2005 | Hottinen et al. | 370/369 |
| 2005/0197080 A1* | 9/2005 | Ulupinar et al. | 455/135 |
| 2005/0245278 A1* | 11/2005 | Vannithamby et al. | 455/522 |
| 2005/0249159 A1* | 11/2005 | Abraham et al. | 370/329 |
| 2005/0286547 A1* | 12/2005 | Baum et al. | 370/437 |
| 2006/0052122 A1* | 3/2006 | Matsui et al. | 455/509 |
| 2006/0116081 A1* | 6/2006 | Shah | 455/67.11 |
| 2006/0135073 A1* | 6/2006 | Kurapati et al. | 455/67.11 |
| 2006/0209721 A1* | 9/2006 | Mese et al. | 370/254 |
| 2007/0081582 A1* | 4/2007 | Ginis et al. | 375/222 |
| 2007/0092177 A1* | 4/2007 | Nilsson et al. | 385/14 |
| 2007/0242774 A1* | 10/2007 | Lo | 375/299 |

\* cited by examiner

METHOD OF ALLOCATING POWER OVER CHANNELS OF A COMMUNICATION SYSTEM

BACKGROUND OF THE INVENTION

1. Field of the Invention

The present invention related to communication, and provides methods for allocating transmission power over channels.

2. Description of Related Art

A problem often encountered in communication, either wireline or wireless, is that of allocating power over a set of parallel non-interacting channels sharing a common transmitter.

Although diverse criteria can be used in order to decide which fraction of the available power is allocated to each of the channels, a particularly enticing one is the maximization of the sum mutual information, which specifies the largest data rate per unit bandwidth that can be conveyed with arbitrary reliability. In the case that the noise impairing the communication is Gaussian, the mutual information is maximized if the transmitted signals are also Gaussian and the power is allocated over the available orthogonal channels according to the well-known waterfill policy.

Despite their optimality, however, Gaussian signals can never be realized in practice because of their infinite and continuous support. Rather, in actual communication systems the signals are modulated using discrete constellations. No solution is known for the power allocation over parallel channels that maximizes the mutual information when the transmitted signals are not Gaussian, and the waterfill policy is often invoked for non-Gaussian signals even though it is no longer optimal in that case.

SUMMARY OF THE INVENTION

The present invention related to communication, and provides methods for allocating transmission power over parallel channels.

In one embodiment, the power for transmitting a signal over at least one of a plurality of channels is allocated based on a channel strength threshold and an estimated channel strength for the at least one channel. Here, the channel strength threshold is based on the estimated channel strengths for the plurality of channels.

In another embodiment, the allocating step allocates power over each of the plurality of channels, and for each channel, the allocating step allocates power based on the channel threshold and the estimated channel strengths for the channels.

In another embodiment, the plurality of channels may be non-interacting parallel channels, and the signals transmitted over at least a portion of the channels may be non-Gaussian.

In one embodiment, the channel strength threshold may be calculated based on the estimated channel strengths for the plurality of channels and an average power available for transmission over the plurality of channels. In another embodiment, the channel strength threshold may be accessed from a memory.

In one embodiment, the estimated channel strength for at least one channel is a normalized representation of a signal-to-noise ratio on the channel.

In one embodiment, the allocating step allocates zero power to a channel in the plurality of channels if the estimated channel strength associated with the channel is less than or equal to the channel strength threshold.

In a further embodiment, the allocating step allocates a non-zero power to a channel in the plurality of channels based on the estimated channel strength for the channel if the estimated channel strength for the channel is greater than the channel strength threshold.

In yet a further embodiment, powers are allocated to a plurality of parallel non-interacting channels such that sum-mutual information over the parallel non-interacting channels is maximized.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EXAMPLE EMBODIMENTS

For the purposes of explanation, a framework for explaining the embodiments of the present invention will be initially provided.

Figure 1:
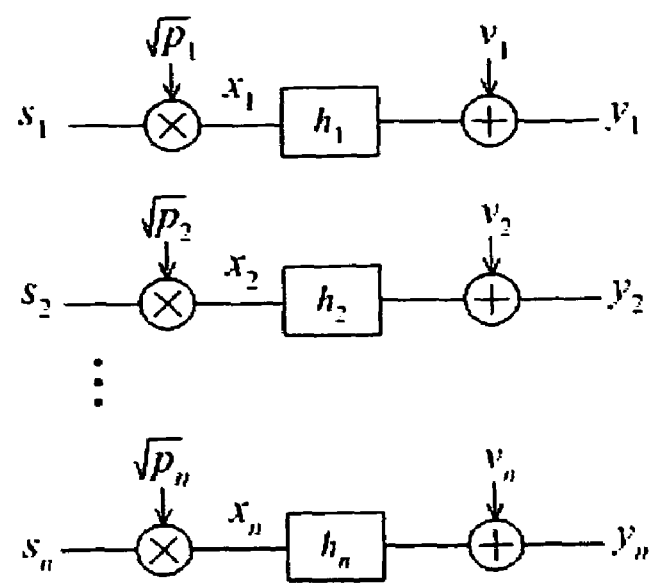
FIG. 1 illustrates a graphical representation of n parallel non-interacting channels.

Consider a set of n parallel non-interacting channels as shown in FIG. 1. On the j-th such channel, the input-output relationship is:

$$y_j = h_j x_j + v_j \qquad (1)$$

where $y_j$ represents the received signal, $x_j$ represents the transmitted signal, $h_j$ is a scalar coefficient that represents the gain of the channel, and $v_j$ represents the noise on the channel. The noise is zero-mean and Gaussian with variance:

$$E[|v_j|^2] = \sigma_j^2 \qquad (2)$$

The input $x_j$ has arbitrary distribution with power:

$$E[|x_j|^2] = p_j \qquad (3)$$

where $E[\cdot]$ is the expected value, and $p_j$ is the power at which the transmitted signal $x_j$ is transmitted over the channel.

Since the n channels are non-interacting, the noise is independent across channels and thus, $$E[v_j v_l^*] = 0 \quad j \neq l \qquad (4)$$

where * denotes the complex conjugate.

The j-th input may be expressed as a unit-power signal $s_j$, whose format defines the corresponding modulation scheme, scaled as:

$$x_j = \sqrt{p_j} s_j \qquad (5)$$

For convenience, a normalized representation of the signal-to-noise ratio may be defined for each channel as:

$$\gamma_j = \frac{|h_j|^2}{\sigma_j^2} \qquad (6)$$

which is a measure or estimate of the strength of that channel. The signal-to-noise ratio at the output of the j-th channel is given by $p_j \gamma_j$. For the purposes of explanation only, coherent communication, where the complex channel gains $h_1, \ldots, h_n$ are estimated and tracked by the receiver, for example, through the transmission of known pilot symbols, is assumed.

Given this framework, according to at least one embodiment of the present invention, a determination is made for the set of powers $p_1, p_2, \ldots, p_n$ such that the aggregate mutual information is satisfied subject to the constraint:

$$\frac{1}{n}\sum_{\ell=1}^{n} p_\ell \leq P_{avg} \qquad (7)$$

where $P_{avg}$ is the average power available for transmission (determined by design parameters such as the size of the amplifiers, the batteries or power supply, etc. known in the art).

Before discussing the determination of the set of powers $p_1, p_2, \ldots, p_n$, the MMSE (minimum mean-square error) incurred on the estimation of the signals $s_1, \ldots, s_n$ will be described to provide a better understanding of the embodiments of the present invention. The estimate of $s_j$ that minimizes the mean-square error is known to be the conditional means estimator, where the estimate is given by:

$$\hat{s}_j = E[s_j | y_j] \qquad (8)$$

which is in general a nonlinear estimator. (It becomes linear in the special case that $s_j$ is Gaussian.) The MMSE is then:

$$\text{i MMSE}_j(p_j \gamma_j) = E[|s_j - \hat{s}_j|^2] \qquad (9)$$

which is a function of the product $p_j \gamma_j$.

EXAMPLE EMBODIMENTS

In view of the above, the power allocation methodology according to one embodiment is provided by:

$$p_j = 0 \quad \gamma_j \leq \eta$$

$$\gamma_j MMSE_j(p_j \gamma_j) = \eta \gamma_j > \eta \qquad (10)$$

where $\eta$ is a channel strength threshold having a value such that equation (7) is satisfied with strict equality. The set of powers satisfying these conditions maximizes the aggregate mutual information over the n channels.

Denoting by $MMSE^{-1}(\cdot)$ the inverse of $MMSE(\cdot)$ with respect to the composition of functions, equation (10) may be recast as:

$$p_j = 0 \qquad \qquad \gamma_j \leq \eta \qquad (11)$$

$$p_j = \frac{1}{\gamma_j} MMSE_j^{-1}(\min\{1, \eta/\gamma_j\}) \quad \gamma_j > \eta$$

with $\eta$ being a solution to the nonlinear equation:

$$\sum_{j=1}^{n} \frac{MMSE_j^{-1}(\min\{1, \eta/\gamma_j\})}{n\gamma_j} = P_{avg} \qquad (12)$$

When implemented, the gain $h_j$ and variance $\sigma_j$ for each received signal $y_j$ are estimated according to any well-known process. For example, techniques for estimating these values based on the pilot symbols in the received signal $y_j$ are very well-known and in use today. For each channel j, the strength is estimated using the gain $h_j$ and the variance $\sigma_j$ according to equation (6). Using the estimated channel strengths and the average power available for transmission (i.e., $P_{avg}$), the channel strength threshold $\eta$ is determined according to equation (12). Then, the powers $p_j$ are then allocated according to equation (11). The allocated powers are then fed back to the transmitter.

Figure 2:
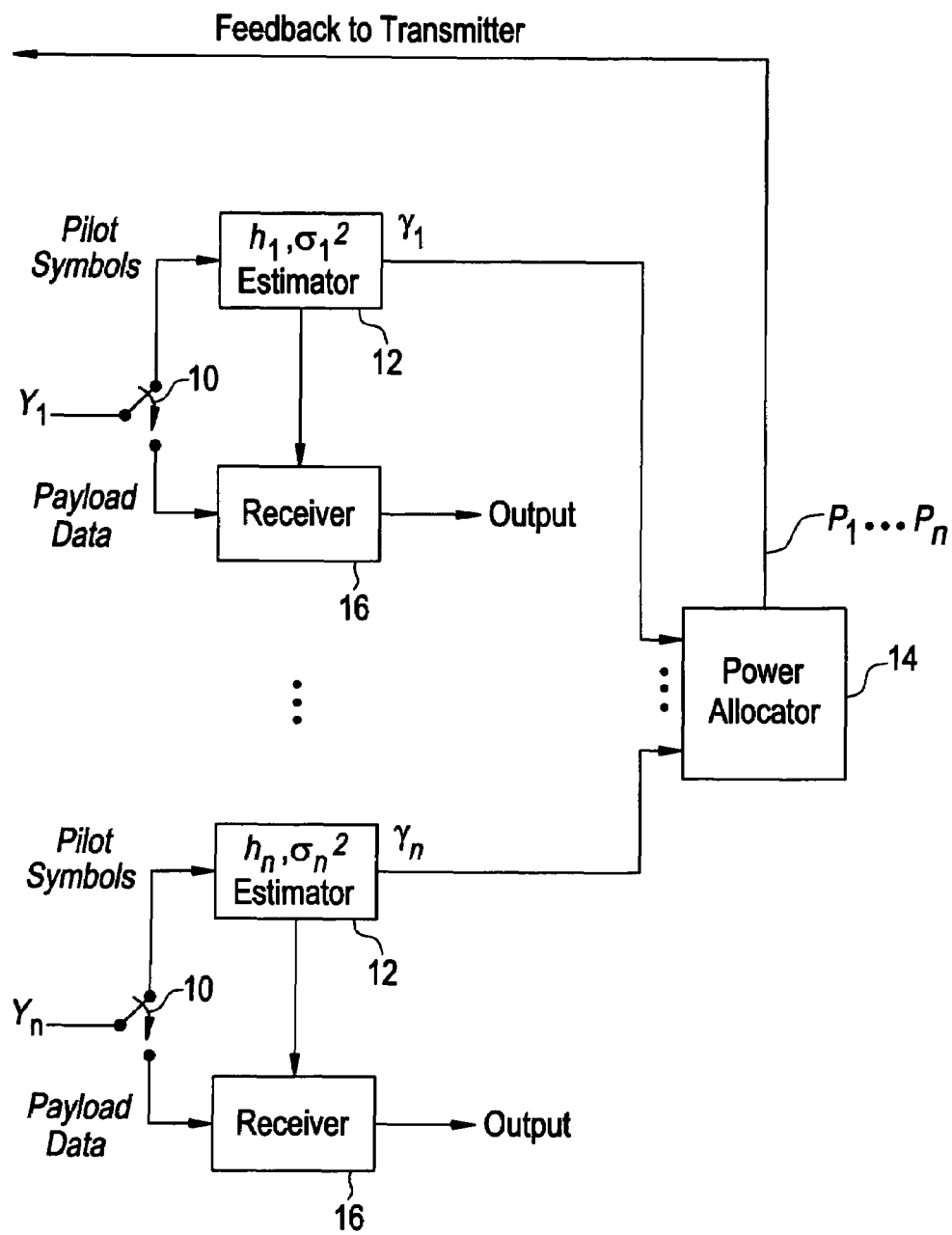
FIG. 2 illustrates an example apparatus embodiment implementing an embodiment of the method for allocating powers according to the present invention.

FIG. 2 illustrates an example apparatus embodiment implementing this embodiment of the method for allocating powers according to the present invention. As shown, data parsers 10 parse the pilot signals from the respectively received signals $y_1 \ldots y_n$, and send the pilot signals to respective channel strength estimators 12. The channel strength estimators 12 estimate the respective gain $h_j$ and variance $\sigma_j$ of the channel over which the signal was received, and estimate the channel strength according to equation (6). Each of the channel strength estimates $\gamma_j$ are fed to a power allocator 14, which also stores the average power available for transmitting over the channels. The power allocator 14 determines the channel strength threshold $\eta$ according to equation (12), and then performs the power allocation according to equation (11). The power allocator 14 feeds back the power allocations to the transmitter. FIG. 2 also shows that the parsers 10 parse out the payload data from the received signals to respective receiver elements 16 for generating output. As will be appreciated, the elements of FIG. 2 may be implemented as a CPU, ASIC, FPGA, etc., or combination thereof at the receiver.

In alternative embodiments of the method and apparatus, the gain and variance values may be fed back to the transmitter, and the transmitter may perform the remainder of the embodiment for allocating powers. As yet another alternative, the estimated channel strengths may be fed back, and the transmitter may perform the remainder of the embodiment for allocating powers.

For $n \to \infty$, we can view the set $\{\gamma_j\}, \forall j$, as realizations of a random variable $\gamma$ whose distribution describes the statistics of a fading channel. If this channel is stationary and ergodic, then $\eta$ becomes the solution to:

$$E\left[\frac{MSE_i^{-1}(\min\{1, \eta/\gamma\})}{\gamma}\right] = P_{avg} \qquad (13)$$

with the expectation taken over $\gamma$. Thus, $\eta$ depends only on the distribution of the fading channel, on $P_{avg}$, and on the format of the inputs. Parameterized by these quantities, $\eta$ may be pre-computed and stored in memory for retrieval at the time of use.

The power allocation method according to the present invention applies to a wide range of communication problems. These include, but are not limited to:

Multicarrier communication, where transmission takes places over several non-overlapping frequency bands. Each of these bands constitutes a channel. Typically, a sum power constraint is in place.

OFDM (orthogonal frequency-division multiplexing), where transmission takes places over several overlapping frequency bands. The spectral shape of the transmitted signals is designed such that despite the overlap, these signals are orthogonal and thus remain non-interacting. OFDM is widely used in wireline DSL (digital subscriber line), wireless audio and video broadcast, wireless LANs, etc. Typically, a sum power constraint is in place. If the number of bands is very large, then the model n→∞ may be a useful idealization and the constraint may be put on the average.

Multi-antenna or MIMO (multiple-input multiple-output) communication, where multiple transmit and multiple receive antennas are employed. If the complex channel gains between these antennas are known by the transmitter, the left singular vectors of the resulting matrix can be used for signaling and the right singular vectors for reception. The result is a set of orthogonal (non-interacting) parallel channels. Usually the sum power is constrained.

Time-varying channels subject to an average power constraint. When the gain of an individual channel varies over time, it can be seen as an infinite succession of parallel channels where each such channel is a symbol or group of symbols over which the gain remains constant. In this case, the idealization n→∞ may be used with an average power constraint.

The invention being thus described, it will be obvious that the same may be varied in many ways. Such variations are not to be regarded as a departure from the invention, and all such modifications are intended to be included within the scope of the invention.

We claim:

1. A method for allocating transmission power, comprising:
   allocating a power for transmitting a signal over at least one of a plurality of channels based on a channel strength threshold and an estimated channel strength for the at least one channel, the channel strength threshold being based on estimated channel strengths for the plurality of channels.

2. The method of claim 1, wherein the plurality of channels are non-interacting parallel channels.

3. The method of claim 1, wherein the allocating step allocates power over each of the plurality of channels, and for each channel, the allocating step allocates power based on the channel threshold and the estimated channel strength for the channel.

4. The method of claim 3, wherein the plurality of channels are non-interacting parallel channels and signals being transmitted over at least a portion of the plurality of channels are non-Gaussian.

5. The method of claim 4, further comprising:
   calculating the channel strength threshold based on the estimated channel strengths for the plurality of channels and an average power available for transmission over the plurality of channels.

6. The method of claim 4, further comprising:
   accessing the channel strength threshold from a memory.

7. The method of claim 4, further comprising:
   estimating a channel strength for each of the plurality of channels.

8. The method of claim 7, wherein the estimated channel strength for at least one channel is a normalized representation of a signal-to-noise ratio on the channel.

9. The method of claim 4, wherein the allocating step allocates zero power to a channel in the plurality of channels if the estimated channel strength associated with the channel is less than or equal to the channel strength threshold.

10. The method of claim 9, wherein the allocating step allocates a non-zero power to a channel in the plurality of channels based on the estimated channel strength for the channel if the estimated channel strength for the channel is greater than the channel strength threshold.

11. The method of claim 10, wherein the allocating step allocates power to a channel j based on the following expression:

$$p_j = 0 \qquad \gamma_j \leq \eta \qquad (11)$$
$$p_j = \frac{1}{\gamma_j} MMSE_j^{-1}(\min\{1, \eta/\gamma_j\}) \quad \gamma_j > \eta$$

where $\gamma_j$ is the estimated channel strength of j, $\eta$ is the channel strength threshold, and $p_j$ is the allocated power for channel j.

12. The method of claim 11, wherein the channel strength threshold is determined according to the following expression:

$$\sum_{j=1}^{n} \frac{MMSE_j^{-1}(\min\{1, \eta/\gamma_j\})}{n\gamma_j} = P_{avg} \qquad (12)$$

wherein $\eta$ is a number of the plurality of channels.

13. The method of claim 4, wherein the allocating step allocates a non-zero power to a channel in the plurality of channels based on the estimated channel strength for the channel if the estimated channel strength for the channel is greater than the channel strength threshold.

14. The method of claim 1, further comprising:
   calculating the channel strength threshold based on the estimated channel strengths for the plurality of channels and an average power available for transmission over the plurality of channels.

15. The method of claim 1, further comprising:
   accessing the channel strength threshold from a memory.

16. The method of claim 1, wherein the estimated channel strength for the at least one channel is a normalized representation of a signal-to-noise ratio on the channel.

17. The method of claim 1, wherein the allocating step allocates zero power to the at least one channel if the estimated channel strength associated with the at least one channel is less than or equal to the channel strength threshold.

18. The method of claim 17, wherein the allocating step allocates a non-zero power to the at least one channel based on the estimated channel strength for the at least one channel if the estimated channel strength for the at least one channel is greater than the channel strength threshold.

19. The method of claim 1, wherein the allocating step allocates a non-zero power to the at least one channel based on the estimated channel strength for the at least one channel if the estimated channel strength for the at least one channel is greater than the channel strength threshold.

20. A method for allocating channel transmission power, comprising:
   allocating powers to a plurality of parallel non-interacting channels based on the average power available for transmission for the plurality of parallel non-interacting channels to maximize sum mutual information over the plurality of parallel non-interacting channels.

* * * * *